United States Patent Office 3,293,308
Patented Dec. 20, 1966

3,293,308
MODE OF RESIN TREATMENT REMAINING AS WASTE AT THE PRODUCTION OF PHENOL BY THE CUMENE METHOD
Alexander Borisovich Vol-Epstein, I Cheriomushkinskaya 4/34 Korp. B, Apt. 239, Moscow, U.S.S.R.
No Drawing. Filed June 19, 1961, Ser. No. 144,276
5 Claims. (Cl. 260—621)

The present invention relates to a method of treating the material remaining as waste from the production of phenol by the cumene method.

230–240 kg. of the so called phenolic material consisting of alpha-methylstyrene, acetophenone, dimethylphenylcarbinol, 2-phenyl-2-hydroxyphenyl-propane, dimeric alpha-methylstyrene, sodium salts (sodium phenolate, sodium sulphate) and a certain amount of other compounds, the composition of which has not been exactly determined is usually obtained as a waste product for every ton of commercial phenol produced by the cumene method.

The purpose of the invention under consideration is to obtain, by way of material treatment, further quantities of phenol, ethylbenzene and isopropylbenzene for reoxidation, thus increasing the output of the commercial production.

The abovementioned purpose of the invention is attained by the removal of sodium salts which poison the catalyst, from the material obtained as waste in the production of phenol by the cumene method. The resin subsequently undergoing catalytic hydrogenation, and the hydrogenate obtained is subjected to rectification with tapping of phenol, ethylbenzene and cumene.

The removal of sodium salts from the resin to be treated is carried out (according to the invention) either by vacuum distillation in which the organic part of the material not containing any sodium salts is separated, or by washing the material with a sulphuric acid solution; whereby the sodium phenolate decomposes while the sodium sulfate which is formed is removed in aqueous solution.

*Example 1*

A resin fraction having a boiling point less up to 220° C. at the pressure was tapped off at distillation under vacuum (10 mm. Hg) and then underwent hydrogenation. The yield of the distillate was as much as 80 percent by weight of the material fraction.

*Example 2*

When washing the resin with 10 percent sulphuric acid (0.5 volume per resin volume) the yield of desalted material, having 15–50 mg. per l. ash content, was 98.5–99.5 percent. Any organic compounds which passed into the water solution were completely extracted by cumene and added to the desalted raw material.

Sulphuric acid washing thus proved more preferable because to the considerable reduction of raw material losses.

The desalted resin obtained by either of the abovementioned methods was hydrogenated. Hydrogenation takes place under following conditions: temperature 200–400° C.; pressure 1–150 atmospheres; speed of raw material supply—0.5–3 raw material volumes per one catalyst volume per hour; and 400–1000 l. hydrogen supply per 1 l. of raw material.

Known hydrogenating catalyst containing active components in the form of pure metals or metal, oxides or metal sulphides on a carrier or without the latter may be used for this purpose.

Hydrogen as well as a hydrogen containing mixture may be used as the hydrogenating gas.

The hydrogenate undergoes rectification with tapping of ethylbenzene, cumene and phenol. After a thorough dephenolization of the cumene obtained (this being performed by alkali washing of the cumene) the latter may be oxidized.

The example and the tables given below show the very essence of the proposed method.

*Example 3*

Phenolic material with no carbolic acid content and desalted by means of sulphuric acid washing underwent hydrogenation in a stream system under the following conditions: temperature, 350° C.; pressure, 50 atmospheres; volumetric speed of raw material supply, 1.5 raw material volumes for one catalyst volume per hour; 800 l. hydrogen supply: 800 l. per liter of raw material. Cobalt molybdate precipitated on aluminium oxide carrier served as a catalyst. Hydrogen consumption per each passage was 1.4 percent (by weight) of the material.

11.1 percent of ethylbenzene, 43 percent of cumene, and 20.9 percent of phenol were obtained after rectification of the hydrogenate. The yield of residue unconverted into useful products amounted to 23.1 percent; 10.8 percent of ethylbenzene, 19.7 percent of cumene and 11 percent of phenol were additionally obtained (in percents of the residue weight) by hydrogenation of this residue.

The total yield obtained after complete treatment of the indicated material was the following: 13.7 percent ethylbenzene; 48.4 percent cumene; 23.5 percent phenol, 13.1 percent unconverted residue of the treated raw material, the rest being water, was and the cyclic fraction. The total hydrogen consumption was as much as 1.6 percent.

The results of experiments carried out at different temperatures and pressures and with varying catalysts are given in Tables 1 and 2.

TABLE 1.—HYDROGENATION OF PHENOLIC MATERIAL ABOVE ALUMINIUM-COBALT-MOLYBDENUM CATALYST

[Volumetric speed is 1.2 raw material volumes per catalyst volume per hour; hydrogen supply, 600 l. per 1 l. of raw material. Yields are given in weight percents of phenolic material without taking into consideration the hydrogen absorbed]

| | | | | |
|---|---|---|---|---|
| Temperature, ° C | 275 | 350 | 350 | 350 |
| Pressure, atm | 50 | 50 | 10 | ¹ 50 |
| Ethylbenzene, percent | 4.9 | 13.9 | 10.1 | 12.6 |
| Cumene, percent | 27.0 | 44.5 | 37.9 | 36.7 |
| Phenol, percent | 13.4 | 19.9 | 22.2 | 25.2 |
| Still hydrogenate, percent | 52.1 | 13.7 | 25.7 | 22.1 |

¹ 1500 l. of a methane-hydrogen mixture containing 30 vol. percent o hydrogen were supplied per 1 l. of raw material.

TABLE 2.—AMOUNT OF UNCONVERTED RESIDUE DEPENDING ON CATALYST USED FOR HYDROGENATION

[Pressure, 50 atmospheres; temperature, 300° C; volumetric speed, 1.5 raw material volumes per catalyst volume per hour; hydrogen supply, 600 l. per 1 l. raw material]

| Catalyst | Stillage bottoms of hydrogenate, weight percents of raw material |
|---|---|
| $WS_2+NiS+Al_2O_3$ | 31.1 |
| $WS_2$ | 27.7 |
| Aluminium-cobalt-molybdenum catalyst | 32.2 |

What is claimed is:

1. In the process for the manufacture of phenol by the cumene method whereby there is formed a decomposition reaction mixture comprising phenol, acetone, alpha-methylstyrene, acetophenone, dimethylphenyl carbinol, dimeric alpha-methylstyrene, 2-phenyl-2-hydroxyphenyl-propane, sodium phenolate, and sodium sulfate, and wherein the phenol and acetone are substantially separated from said decomposition reaction mixture to leave a residue containing said alpha-methylstyrene, acetophenone, dimethylphenyl carbinol, dimeric alpha-methylstyrene, para-alpha-cumyl phenol, sodium phenolate and sodium sulphate, the improvement which comprises removing the sodium salts from said residue, then catalytically hydrogenating said sodium-free residue to form additional quantities of phenol, ethylbenzene and cumene, and thereafter fractionally distilling said hydrogenated sodium-free residue to separate the ethylbenzene fraction, the phenol fraction, and the cumene fraction.

2. The method of claim 1 wherein the sodium salts are removed from said residue by washing said residue with sulfuric acid and separating the sodium salt containing aqueous fraction from said residue.

3. The method of claim 1 wherein the sodium salts are removed from said residue by vacuum distilling said residue to obtain a sodium-free distillate.

4. The method of claim 2 wherein hydrogenation is carried out in a stream at a temperature of 100–400° C., at a pressure of 1–150 atmospheres, a volumetric speed of supply of 0.5–3 of said sodium-free residue per one volume of catalyst and a hydrogen supply of 400–1000 liters per liter of sodium free residue.

5. The method of claim 3 wherein hydrogenation is carried out in a stream at a temperature of 100–400° C., at a pressure of 1–150 atmospheres, a volumetric speed of supply of 0.5–3 of said sodium-free distillate per one volume of catalyst and a hydrogen supply of 400–1000 liters per liter of sodium-free distillate.

References Cited by the Examiner

UNITED STATES PATENTS

| | | | |
|---|---|---|---|
| 2,715,145 | 8/1955 | Bewley et al. | 260—621 |
| 2,734,085 | 2/1956 | Adams et al. | 260—621 X |
| 2,737,480 | 3/1956 | Adams et al. | 260—621 X |
| 2,757,209 | 7/1956 | Joris | 260—621 |
| 2,909,568 | 10/1959 | Gleim | 260—621 X |

OTHER REFERENCES

Moldavskii et al.: Chem. Abstracts, 29:2153 (1935).
Kubica et al.: Chem. Abstracts, 54:22,456 (1960).
Landa et al.: Chem. Abstracts, vol. 54 (1960) p. 13046 (1 page).
Hawkins, "Organic Peroxides," pp. 88, 89, 90 (1961).
Tonn, William H., Jr.: "Today's Processes Are Compared," Chem. Eng. (November 1954), pp. 157–160.

LEON ZITVER, *Primary Examiner.*

H. G. MOORE, *Examiner.*

D. M. HELFER, *Assistant Examiner.*